US011043723B2

(12) United States Patent
Mason (10) Patent No.: US 11,043,723 B2
(45) Date of Patent: Jun. 22, 2021

(54) LOW VOLTAGE PROTECTOR FOR SYSTEMS BATTERY

(71) Applicant: R & WJ Enterprises Pty Ltd, Landsdale (AU)

(72) Inventor: Robert Mason, Landsdale (AU)

(73) Assignee: R & WJ Enterprises Pty Ltd

( * ) Notice: Subject to any disclaimer, the term of this patent is extended or adjusted under 35 U.S.C. 154(b) by 46 days.

(21) Appl. No.: 16/463,724

(22) PCT Filed: Aug. 11, 2017

(86) PCT No.: PCT/AU2017/050852
§ 371 (c)(1),
(2) Date: May 23, 2019

(87) PCT Pub. No.: WO2018/094449
PCT Pub. Date: May 31, 2018

(65) Prior Publication Data
US 2019/0379031 A1    Dec. 12, 2019

(30) Foreign Application Priority Data

Nov. 24, 2016 (AU) ............................ 2016904829

(51) Int. Cl.
*H01M 2/34* (2006.01)
*H01M 50/572* (2021.01)
(Continued)

(52) U.S. Cl.
CPC ........... *H01M 50/572* (2021.01); *B60L 50/64* (2019.02); *B60R 16/04* (2013.01); *H01M 10/48* (2013.01);
(Continued)

(58) Field of Classification Search
CPC .... H01M 2/34; H01M 10/48; H01M 2220/20; H01M 2010/4271; H01M 10/06;
(Continued)

(56) References Cited

U.S. PATENT DOCUMENTS

| 5,477,124 | A | 12/1995 | Tamai |
| 7,612,524 | B2* | 11/2009 | Howell ................. H02J 7/0029 320/104 |
| 2012/0001484 | A1 | 1/2012 | Hsu |
| 2012/0175972 | A1* | 7/2012 | Ren ...................... H02J 7/0031 307/130 |
| 2012/0187912 | A1 | 7/2012 | Brun-Buisson et al. |
| 2017/0144549 | A1* | 5/2017 | Park ......................... H02H 7/20 |

FOREIGN PATENT DOCUMENTS

| CN | 205377371 | 7/2016 |
| CN | 106058342 | 10/2016 |

(Continued)

OTHER PUBLICATIONS

Manual for BatteryProtect® device from Victron Energy (Year: 2008).*

(Continued)

*Primary Examiner* — Michael L Dignan
(74) *Attorney, Agent, or Firm* — Taylor English Duma LLP (57) ABSTRACT

A battery cut-out device (11) has a housing (13) which interposes between a battery terminal and the vehicle lead that connected to the battery terminal. At one end (17) of the housing a first high current capacity termination (18) to connect to the battery terminal, and at the other end (21) of the housing (13) a second high current capacity termination (22) connects to the battery lead. A fly lead (25) extends from the housing (13) which connects to the other battery terminal to provide power to electronics in the housing. Also located at one end of the housing is a press-to-make momentary push button switch (27) which is provided to perform a reset function, and an LED indicator (29) which is provided to show the operational status of the battery cut-out device (Continued)

(11). The reset function electrically connects terminations (18) and (22), and the electronics disconnects these terminations if the battery voltage falls below a predetermined level.

18 Claims, 4 Drawing Sheets

(51) Int. Cl.
  *B60R 16/04* (2006.01)
  *H01M 10/48* (2006.01)
  *H02J 7/00* (2006.01)
  *B60L 50/64* (2019.01)
(52) U.S. Cl.
  CPC ....... *H02J 7/0031* (2013.01); *H01M 2220/20* (2013.01); *H02J 7/00306* (2020.01)
(58) Field of Classification Search
  CPC ........... H01M 10/052; H01M 2200/00; H01M 10/425; B60L 50/64; B60L 2240/547; B60R 16/04; H02J 7/0031; H02J 7/00306
  See application file for complete search history.

(56) References Cited

FOREIGN PATENT DOCUMENTS

| | | |
|---|---|---|
| CN | 206282918 | 6/2017 |
| CN | 206806436 | 12/2017 |
| CN | 206820072 | 12/2017 |
| EP | 2495799 | 9/2012 |

OTHER PUBLICATIONS

Mason, Robert; International Search Report and Written Opinion for PCT/AU2017/050852, filed Aug. 11, 2017, dated Oct. 4, 2017, 8 pgs.
Hunan Huahui New Energy Co. Ltd.; Article entitled: "12v 20ah 1000CCA Titanate Lithium Battery for Road or Passenger Car", located at <https://huahuienergy.en.made-in-china.com/product/NvBngyiEAKhr/China-12V-20ah-1000CCA-Titanate-Lithium-Battery-for-Road-or-Passengaer-Car.html, accessed on May 17, 2019, 6 pgs.
Victron Energy; Brochure for BatteryProtect 65A/100A/220A, publicly available prior to Nov. 24, 2016, 1 pg.

\* cited by examiner

LOW VOLTAGE PROTECTOR FOR SYSTEMS BATTERY

TECHNICAL FIELD

This invention relates to batteries and in particular a control circuit arrangement for preventing excessive discharge of a battery. This invention is primarily intended for automotive applications, but will also have application in stationary battery applications.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

Various solutions have been proposed to solve the problem of being unable to start a motor vehicle when the 12 volt lead acid battery fails. This can be due to excessive discharge or age resulting in the battery reaching a condition where it has insufficient capacity to operate the starter motor in order to start the internal combustion engine.

One solution to this problem has entailed protection against over discharge built into non-essential accessories. An example of this is a low voltage cut-out built into car fridges such as the type sold under the trade mark Engel. These are popular with camping enthusiasts who go off-road, and in these circumstances, it is important to be able to start the vehicle in a situation where one may be remote from civilisation and help, in the event of such a breakdown. This type of cut-out would work well in older vehicles having no other circuits that would continue to draw on the battery, and as a consequence, modern vehicles with their heavy dependence on electronics that continue to operate when the vehicle is not operating, are not saved by such arrangements.

The invention seeks to provide an alternative arrangement for users of vehicles or other critical systems to protect the battery against over-discharge.

In a broadest embodiment the invention will provide an arrangement in an automotive application, which will operate to protect a user against being stranded with an internal combustion engine powered vehicle that they cannot start, due to there being insufficient charge to operate the starter motor. The starter motor in an internal combustion engine powered vehicle has a high current demand, often in the hundreds of amps, and so requires sufficient remaining charge capacity in the battery to operate.

In a more preferred arrangement, the invention will provide an arrangement which will operate to protect the battery against over-discharge and against irreversible damage that can occur due to this, while in an automotive application also protecting a user against being stranded with a vehicle that they cannot start, due to there being insufficient charge to operate the starter motor.

Since batteries all suffer to some extent from self-discharge, it will be understood that there is a time constraint, and the invention will not necessarily ensure that a battery remains protected for years or decades.

Throughout the specification unless the context requires otherwise, the word "comprise" or variations such as "comprises" or "comprising", will be understood to imply the inclusion of a stated integer or group of integers but not the exclusion of any other integer or group of integers.

SUMMARY OF INVENTION

In accordance with the invention there is provided a battery cut-out device to interpose between a battery terminal and an existent battery lead connected thereto, said battery cut-out device having a housing to co-locate with the battery, said battery cut-out device having a first high current capacity termination to connect to said battery terminal in place of the existent battery lead, and said battery cut-out device having a second high current capacity termination to connect to the existent battery lead, said battery cut-out device having a fly lead to connect to a terminal of opposite polarity forming a circuit with said battery terminal to provide a power supply for said battery cut-out device, said battery cut-out device having a high current capacity switch selectively connecting between said first high current capacity termination and said second high current capacity termination to make or break the connection therebetween, said high current capacity switch being controlled by a monitoring circuit that senses if a voltage equating to the battery voltage drops below a predetermined level indicative of at least 5% capacity remaining of said rated battery capacity and remains below said predetermined level for a predetermined period of at least five seconds, said monitoring circuit having an output interfaced with said high current capacity switch, said output changing state on said monitoring circuit sensing said voltage equating to the battery voltage dropping below said predetermined level and remaining below said predetermined level for said predetermined period, to deactuate said high current capacity switch; said battery cut-out device including a manually actuable reset switch to reset and reactuate said high current capacity switch.

It is considered that 5% capacity is sufficient capacity in an automotive application to be able to start an internal combustion engine, and so restore charging to the battery via the vehicle alternator and electrical systems.

Preferably said predetermined level equates to a level indicative of at from 5% to 15% capacity remaining of said rated battery capacity.

Preferably said predetermined level equates to a level indicative of at from 8% to 12% capacity remaining of said rated battery capacity.

Preferably said predetermined level equates to a level indicative of about 10% capacity remaining of said rated battery capacity. Such an arrangement is suitable for lithium iron phosphate batteries in an automotive or stationary applications (such as in off-grid or grid connected electricity storage), to preserve the cells against degradation.

Preferably, in an alternative arrangement said predetermined level equates to a level indicative of at from 40% to 50% capacity remaining of said rated battery capacity. Such an arrangement provides optimum charge retention for a lead acid battery used in an automotive application (as opposed to stationary batteries) in order to maintain cranking capacity.

Preferably said high current capacity switch also disrupts power to said monitoring circuit, and said manually actuable reset switch restores power to said monitoring circuit. In this manner said reset switch is connected to said fly lead, and power to said monitoring circuit is latched on by said high current capacity switch.

Preferably said predetermined level is set at from 1% to 5% above the minimum operating voltage of the battery.

Preferably said predetermined level is set at from 1% to 4% above the minimum operating voltage of the battery.

Preferably said predetermined level is set at from 2% to 3.5% above the minimum operating voltage of the battery.

Preferably said predetermined level is set at from 2.5% to 3.3% above the minimum operating voltage of the battery.

A level of 2.5% above the minimum operating voltage of the battery equates to 12 volts which is the ideal set point for a lead acid battery. A lead acid cell has an open circuit operating voltage of from 1.9 volts when fully discharged to 2.1 volts when fully charged. A predetermined level of 12.4 volts for a lithium iron phosphate battery equates to 3.3% of the minimum operating voltage for the battery. A lithium iron phosphate cell has an operating voltage range of from 3.0 volts to 3.3, and will run at 3.2 volts until nearly discharged, before the voltage of the cells begins to drop as they approach exhaustion. Batteries incorporating these cells usually have cell management circuitry to ensure that the voltage does not fall below 2.5 volts, to ensure that individual cells are not damaged.

Alternatively said predetermined level is set at from 1% to 5% below the nominal operating voltage of the battery.

Preferably said predetermined level is set at from 1% to 4% below the nominal operating voltage of the battery.

Preferably said predetermined level is set at from 2% to 3.5% below the nominal operating voltage of the battery.

Preferably said predetermined level is set at from 2.5% to 3.3% below the nominal operating voltage of the battery.

In the case of a lithium iron phosphate cell based battery, with a nominal cell voltage of 3.2 volts, a predetermined level set at 3.3% below the nominal cell voltage equated to a cell voltage of 3.1 volts, and in a 12 volt battery, a battery voltage of 12.4 volts. This equates to 3.1 voltes per cell, there being four cells in series to provide 12.4 volts.

Preferably said predetermined level is set at about 12 volts for lead acid batteries, and about 12.4 volts for lithium iron phosphate batteries.

Preferable said predetermined level is set at between 1.95 volts and 1.96 volts per cell for a lead acid battery. This equates to 40% capacity remaining in the battery. The predetermined level set at 12 volts for a lead acid battery equates to 2 volts per cell, and 50% charge remaining in the battery.

Preferably said predetermined period is up to 20 seconds.

Preferably said predetermined period is about 10 seconds.

Preferably said battery terminal is the negative terminal of said battery and said terminal of opposite polarity is the positive terminal of said battery.

The fly lead may incorporate an in-line connector for connecting to the battery, which the user can readily disconnect to power down the battery cut-out device, and in so doing, disconnect power being supplied by the battery. The in line connector may be a male-female spade terminal connection or other similar connector, allowing quick user disconnect and reconnect. This in line connector may be replaced by a momentary push to break switch contained within the housing. Either would provide a convenient means of disconnecting a battery in a vehicle, when, for example, the vehicle is being placed in storage, rather than physically removing a battery lead from a battery terminal.

Also in accordance with the invention, there is provided, in a battery, a battery cut-out device interposed between a battery terminal and an external battery connector, said battery cut-out device having a fly lead to connect to a terminal of opposite polarity forming a circuit with said battery terminal to provide a power supply for said battery cut-out device, said battery cut-out device having a high current capacity switch selectively connecting between said battery terminal and said external battery connector to make or break the connection therebetween, said high current capacity switch being controlled by a monitoring circuit that senses if a voltage equating to the battery voltage drops below a predetermined level indicative of at least 5% capacity remaining of said rated battery capacity and remains below said predetermined level for a predetermined period of at least five seconds, said monitoring circuit having an output interfaced with said high current capacity switch, said output changing state on said monitoring circuit sensing said voltage equating to the battery voltage dropping below said predetermined level and remaining below said predetermined level for said predetermined period, to deactuate said high current capacity switch; said battery cut-out device including a manually actuable reset switch to reset and reactuate said high current capacity switch.

Preferably said predetermined level equates to a level indicative of at from 5% to 15% capacity remaining of said rated battery capacity.

Preferably said predetermined level equates to a level indicative of at from 8% to 12% capacity remaining of said rated battery capacity.

Preferably said predetermined level equates to a level indicative of about 10% capacity remaining of said rated battery capacity.

Preferably, in an alternative arrangement said predetermined level equates to a level indicative of at from 40% to 50% capacity remaining of said rated battery capacity.

Preferably said high current capacity switch also disrupts power to said monitoring circuit, and said manually actuable reset switch restores power to said monitoring circuit. In this manner said reset switch is connected to said fly lead, and power to said monitoring circuit is latched on by said high current capacity switch.

Preferably said predetermined level is set at from 1% to 5% above the minimum operating voltage of the battery.

Preferably said predetermined level is set at from 1% to 4% above the minimum operating voltage of the battery.

Preferably said predetermined level is set at from 2% to 3.5% above the minimum operating voltage of the battery.

Preferably said predetermined level is set at from 2.5% to 3.3% above the minimum operating voltage of the battery.

A level of 2.5% above the minimum operating voltage of the battery equates to 12 volts which is the ideal set point for a lead acid battery. A lead acid cell has an open circuit operating voltage of from 1.9 volts when fully discharged to 2.1 volts when fully charged. A predetermined level of 12.4 volts for a lithium iron phosphate battery equates to 3.3% of the minimum operating voltage for the battery. A lithium iron phosphate cell has an operating voltage range of from 3.0 volts to 3.3, and will run at 3.2 volts until nearly discharged, before the voltage of the cells begins to drop as they approach exhaustion. Batteries incorporating these cells usually have cell management circuitry to ensure that the voltage does not fall below 2.5 volts, to ensure that individual cells are not damaged.

Alternatively said predetermined level is set at from 1% to 5% below the nominal operating voltage of the battery.

Preferably said predetermined level is set at from 1% to 4% below the nominal operating voltage of the battery.

Preferably said predetermined level is set at from 2% to 3.5% below the nominal operating voltage of the battery.

Preferably said predetermined level is set at from 2.5% to 3.3% below the nominal operating voltage of the battery.

In the case of a lithium iron phosphate cell based battery, with a nominal cell voltage of 3.2 volts, a predetermined level set at 3.3% below the nominal cell voltage equated to a cell voltage of 3.1 volts, and in a 12 volt battery, a battery voltage of 12.4 volts.

Preferably said predetermined level is set at about 12 volts for lead acid batteries, and about 12.4 volts for lithium iron phosphate batteries.

Preferably said predetermined period is up to 20 seconds.

Preferably said predetermined period is about 10 seconds.

Preferably said battery terminal is the negative terminal of said battery and said terminal of opposite polarity is the positive terminal of said battery.

The fly lead may incorporate an in-line connector connecting to the battery, which the user can disconnect to power down the battery cut-out device, and in so doing, disconnect power being supplied by the battery. This may be replaced by a momentary push to break switch. Either would provide a convenient means of disconnecting a battery in a vehicle, when, for example, the vehicle is being placed in storage, rather than physically removing a battery lead from a battery terminal.

BRIEF DESCRIPTION OF DRAWINGS

Two preferred embodiments of the invention will be described with reference to the drawings, in which.

DESCRIPTION OF EMBODIMENTS

Figure 1:
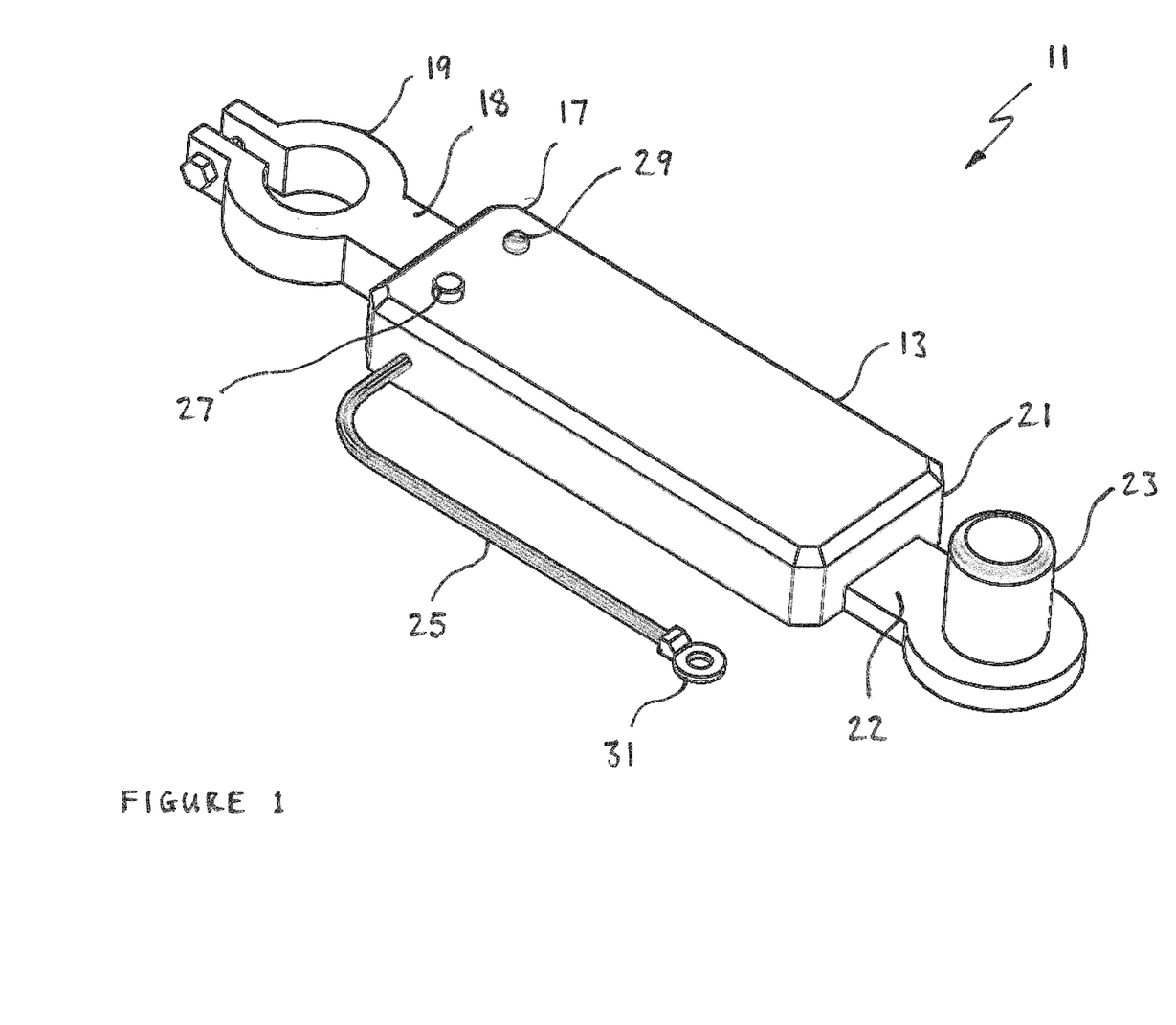
FIG. 1 is a perspective view of one embodiment of a battery cut-out device according to the invention.
Figure 4:
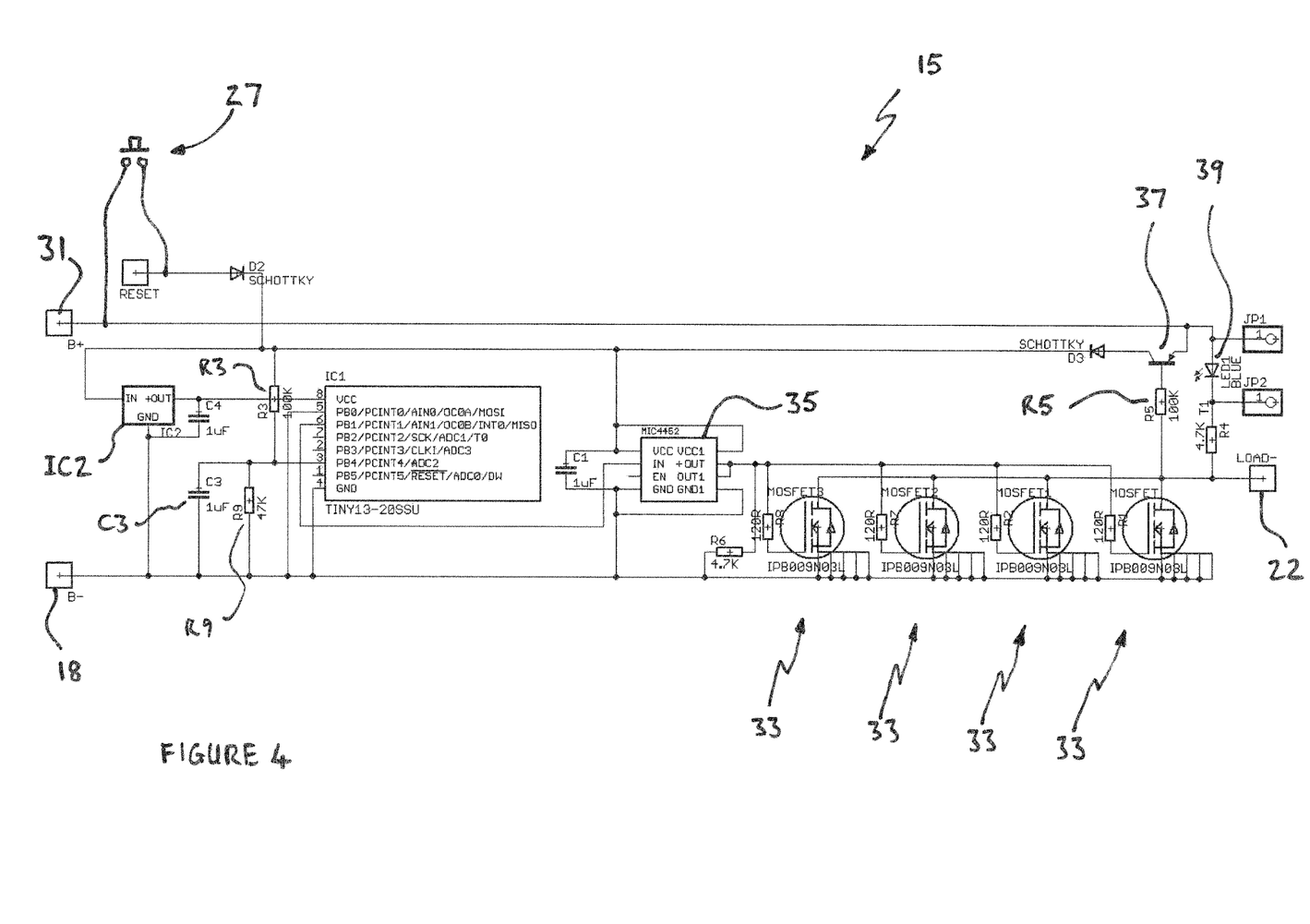
FIG. 4 is a circuit diagram of the circuitry contained in the battery cut-out device of FIGS. 1 to 3.

Referring to FIG. 1, the battery cut-out device indicated generally at 11 has a housing 13 which contains electronics indicated generally at 15, shown in FIG. 4. At one end 17 of the housing a first high current capacity termination 18 in the form of a battery terminal clamp 19 is provided, and at the other end 21 of the housing 13 a second high current capacity termination 22 in the form of a terminal post 23 is provided. A fly lead 25 extends from one end of the housing 13. Also located at one end of the housing is a press-to-make momentary push button switch 27 which is provided to perform a reset function, and an LED indicator 29 which is provided to show the operational status of the battery cut-out device 11.

The battery cut-out device 11 connects by its battery clamp 19 to the negative terminal of a motor vehicle battery. The negative terminal of a motor vehicle battery normally connects to the chassis ground via a terminal lead with a battery clamp. When the battery cut-out device 11 is installed in a motor vehicle, this existing battery clamp is connected to the terminal post 23, so the battery cut-out device 11 is inserted in the battery ground connection. This arrangement is advantageous since it minimises the risk of accidental shorting which could occur if connection to the positive terminal is utilised. The fly lead 25 has a crimp ring terminal 31 to connect to the positive terminal of the battery, in order to provide power to the electronics 15.

Figure 2:
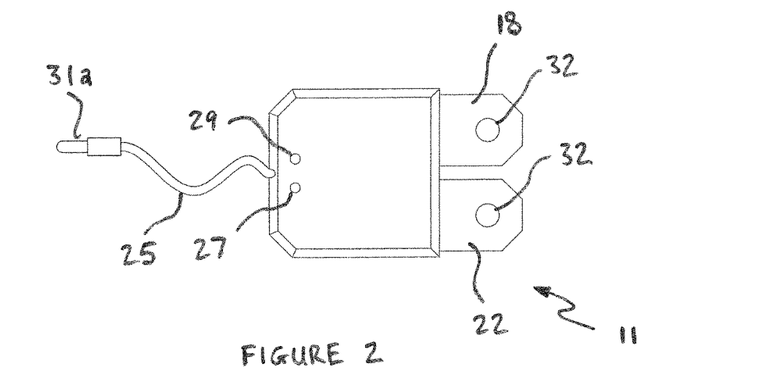
FIG. 2 is a top plan view of a second embodiment of a battery cut-out device according to the invention.
Figure 3:
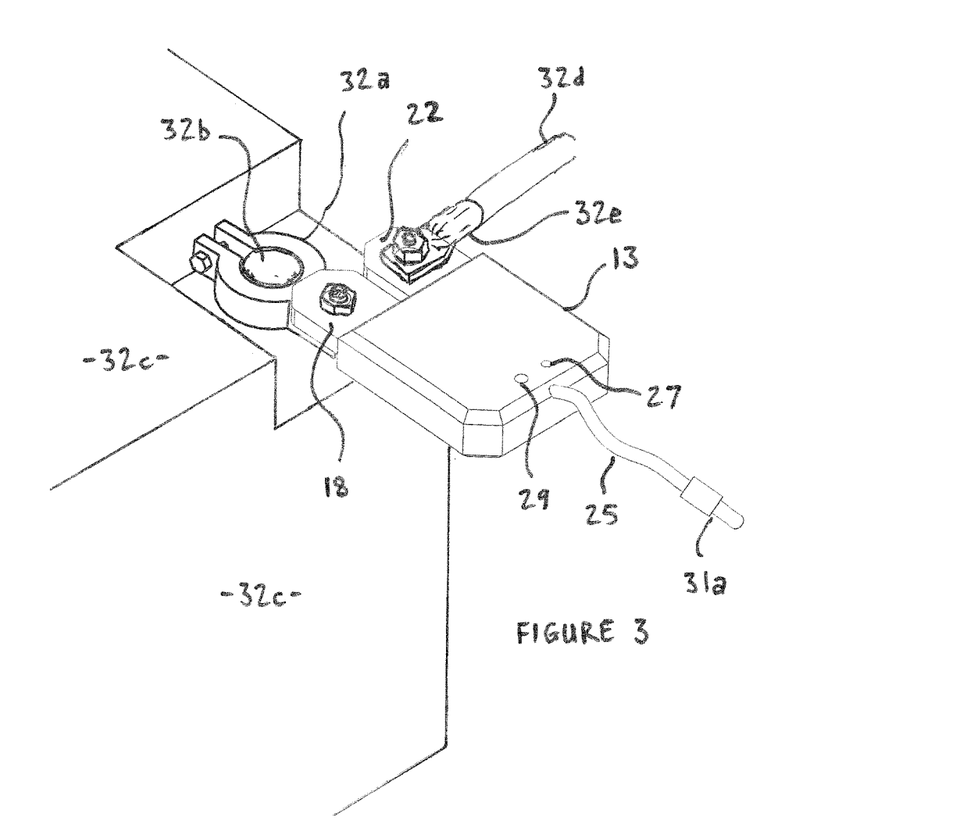
FIG. 3 is a perspective view of the battery cut-out device of FIG. 2 shown connected to a lead acid battery.

The second embodiment illustrated in FIGS. 2 and 3 utilises a more compact housing 13 with the first high current capacity termination 18 and second high current capacity termination 22 being provided as tab connectors each having an aperture 32 to allow the tab connectors to be secured by a nut and bolt that passes therethrough. The first high current capacity termination 18 and second high current capacity termination 22 are provided along one edge of the housing 13.

The first high current capacity termination 18 is bolted to a terminal clamp 32a which connects to the negative terminal post 32b of the battery 32c. A high current capacity ground cable 32d connects by a high current capacity eyelet connector 32e bolted to the second high current capacity termination 22. The fly lead 25 terminates in a male bullet connector 31a which is connectable with a further fly lead terminating in a female bullet connector (not shown). The further fly lead connects to the positive terminal (unswitched) of the battery, to provide +12 volts to the circuitry shown in FIG. 4. The female bullet connector has a shroud which prevents accidental grounding of the +12 volt supply.

The more compact arrangement of the second embodiment is advantageous where there may be little space around a vehicle battery to locate the battery cut out device of the first embodiment.

The second high current termination 22 (terminal post 23 in the embodiment illustrated in FIG. 1) is electrically connectable to the first high current termination 18 (battery clamp 19 in the embodiment illustrated in FIG. 1) by four N-channel MOSFET transistors 33 connected in parallel, with their drains connected to the first high current termination 18 and their sources connected to the second high current termination 22. The gates of the MOSFETs 33 are driven by mosfet driver IC 35. The transistors 33 are IPB009NO3L types manufactured by Infineon Technologies, while the mosfet driver IC 35 is a MIC4462.

Power is supplied from the fly lead 25 via a pnp transistor 37 to power supply comprising voltage regulator IC2, only when the transistors 33 are switched on, or via reset switch 27 when made, when the transistors 33 are switched on. When the transistors 33 are switched off resistor R5 ceases to conduct, switching off pnp transistor 37, which switches off supply of power to voltage regulator IC2.

IC1 is a microcontroller which when powered on provides a logical high to the IN terminal of mosfet driver IC 35, switching on transistors 33. Initial power on when the battery cut-out device 11 is first installed is provided by manually pressing the push to make reset switch 27. This turns on transistors 33 and switches on pnp transistor 37, in a latch circuit to ensure continued supply of power to voltage regulator IC2. As long as transistors 33 are conducting, LED 39 will be illuminated.

The ADC input of IC1 includes a voltage divider formed by resistors R3 and R9, smoothed by capacitor C3. IC1 is programmed to operate so that if it times out a period of ten seconds where the voltage measured at ADC input remains continuously at a level equating to a voltage of 12 volts of less for a lead acid battery (or 12.4 volts or less for a lithium phosphate iron battery) it will flip the output to a logical low fed to the IN terminal of mosfet driver IC 35, switching off MOSFETs 33, and cutting the power to the vehicle systems. This cutting of power will occur where the voltage detected is going close to a point, equating to roughly 10% capacity remaining, where if discharge continued, there would be a serious risk that the battery would be too depleted to operate the starter motor to start the vehicle.

The cutting of power could occur due to operation of vehicle accessories such as a stereo system, or a fridge. Alternatively it could occur due to slow discharge of the battery by on-board vehicle systems. In either case, further discharge of the battery is prevented, and the vehicle owner must manually reset the unit by pressing the reset switch 27 before attempting to restart the vehicle. The forcing of the vehicle user to manually reset the unit causes the vehicle user to consider whether the cutting of power may be due to their activities, or indicative of a battery being depleted due to age, alerting the vehicle user to the need to replace the battery, and avoiding the vehicle user possibly making the discovery that the vehicle battery is unserviceable at an inopportune time or location, such as at a location away from civilisation and assistance. The LED 39 allows the vehicle user to verify the operational status of the battery cut-out device 11. If the battery cut-out device 11 has cut off power, the LED 39 will not be illuminated. When the reset switch 27 is pressed, the LED 39 will illuminate, indicating to the vehicle user that they can start the vehicle.

In an alternative embodiment, the reset switch 27 and possibly also the LED 39 may be located away from the unit, perhaps embodied in a remote transmitter receiver pair, or as a remote switch wired from the vehicle dashboard to the unit. Either embodiments would serve to alert the user to the precarious condition of the battery.

Figure 5:
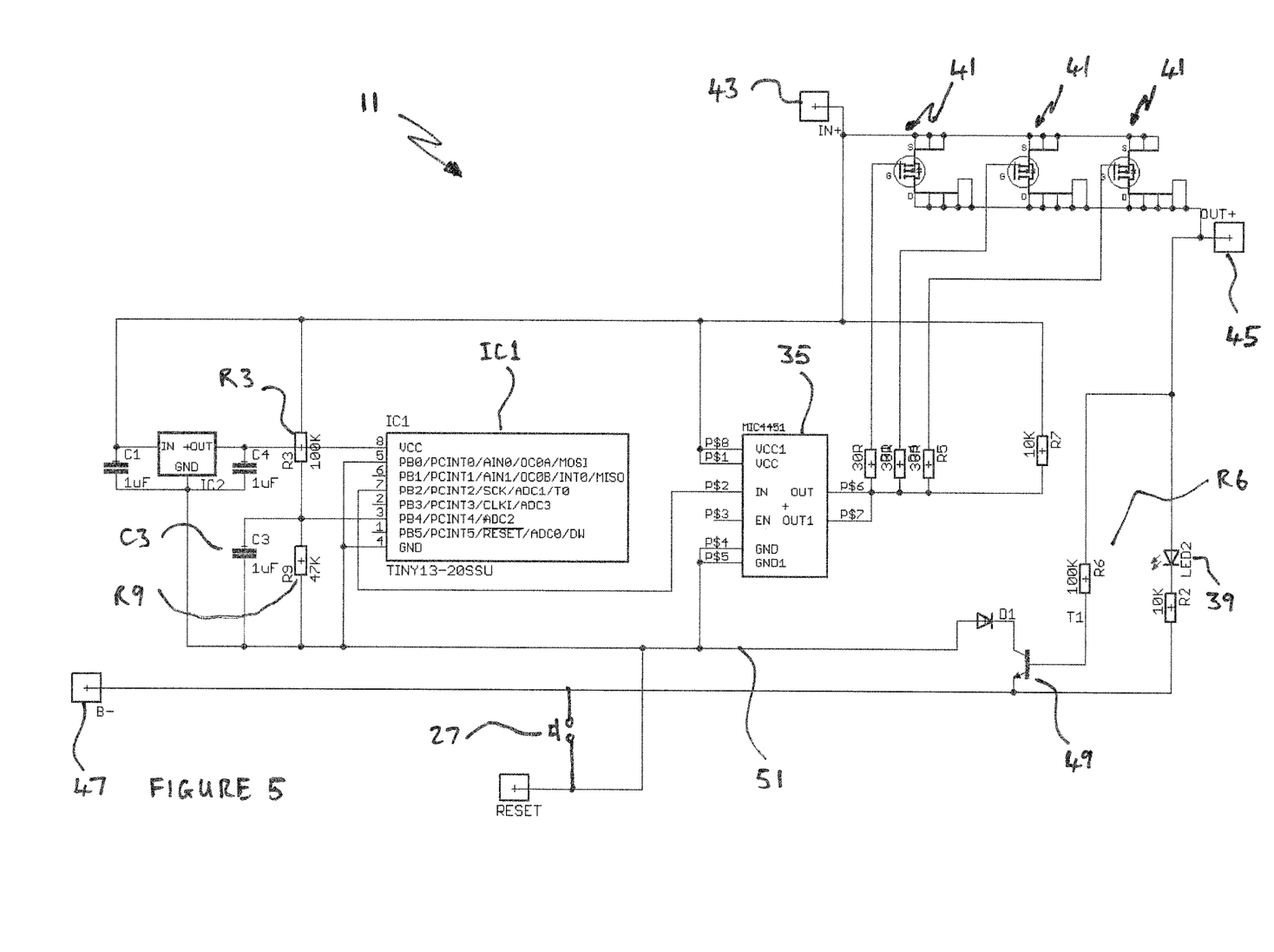
FIG. 5 is a circuit diagram of circuitry for a battery cut-out device according to a third embodiment.

The third embodiment shown in FIG. 5 is functionally the same as the first embodiment except that battery cut-out device 11 is intended to be built into a 12 volt lithium iron phosphate battery pack. The MOSFET transistors 41 have their sources connected to the positive terminal 43 of the battery and these transistors switch the positive supply, with their drains connected to a positive terminal 45. The positive terminal 45 is the connection point for supply of power from the battery, to whatever application the user intends.

The power circuit to the battery cut-out device 11 is completed by connecting to the battery negative terminal 47. Power is supplied from battery negative terminal 47 via an npn transistor 49 to the circuit ground 51, only when the transistors 41 are switched on, or via reset switch 27 when made, when the transistors 33 are switched on. When the transistors 41 are switched off resistor R6 ceases to conduct, switching off npn transistor 49, which breaks the power circuit to the battery cut-out device 11.

As with the circuit of FIG. 4, IC1 is a microcontroller which when powered on provides a logical high to the IN terminal of mosfet driver IC 35, switching on transistors 41. Initial power on, and power on after reset is provided by manually pressing the push to make reset switch 27, which in this circuit bypasses transistor 49, and makes the power circuit to voltage regulator IC2, which supplies power to IC1, which operates as described above, turning on transistors 41 and switching on npn transistor 49, to ensure continued operation of the battery cut-out device 11. Also in common with the circuit of the first embodiment, as long as transistors 41 are conducting, LED 39 will be illuminated.

As with the circuit of the FIG. 4, the ADC input of IC1 includes a voltage divider formed by resistors R3 and R9, smoothed by capacitor C3. IC1 is programmed to operate so that if it times out a period of ten seconds where the voltage measured at ADC input remains continuously at a level equating to a voltage of 12.4 volts of less for the lithium phosphate iron battery, it will flip the output to a logical low fed to the IN terminal of mosfet driver IC 35, switching off MOSFETs 41, and cutting the power available at terminal 45. This cutting of power will occur at a point, where if discharge continued, there would be a serious risk that one or more cells in the battery would be damaged. The need for the user to manually reset the battery using the reset switch, alerts the user to the fact that a problem has occurred. If the need to reset occurs and there is no reason known to the user, this could be due to individual cells in the battery having become unbalanced, and the user can then take steps to have this rectified.

In the arrangement of the second embodiment, the fly lead 25 with its male bullet terminal, and the further fly lead and with its a female bullet connector connecting to the positive terminal of the battery, in order to provide power to the electronics 15. In this arrangement the user can disconnect the bullet connectors which will result in the battery being isolated from the vehicle, preventing any discharge. This can be useful if the vehicle is not going to be used for some time, and is far more convenient than having to disconnect the ring terminal or another battery terminal either of which would require the use of a spanner. Bullet connectors may be replaced by other similar connectors such as spade connectors, in order to allow a quick connect/disconnect, as will be appreciated by the skilled addressee.

In a further embodiment the first embodiment may be modified by including a male spade connector and shrouded female spade connector in line with the fly lead 25, with the shrouded female spade connector electrically connected with the crimp ring terminal 31, to provide a quick way for the vehicle owner to isolate the vehicle battery. Other alternatives to this would be placing a normally closed switch in line in the fly lead 25 to the ring terminal 31, or locating this switch in the housing 13. The same alternative arrangements can be made to the second embodiment, with a normally closed switch in-line between the battery negative terminal 47 and the reset switch 27 and emitter of transistor 49.

Further embodiments are envisaged where the reset switch may be provided as an external switch that connects to a header on the housing or battery, so the switch can be located in the cabin of the vehicle, for actuation by the driver from within the cabin. Alternatively, a radio remote fob could be provided to perform the reset function, but this would require the receiver end associated with the housing, to be powered all the time. Other modifications that can be made without departing from the spirit and scope of the invention, will be apparent to the person skilled in the art.

The claims defining the invention are as follows:

1. A battery cut-out device to interpose between a battery terminal and an existent battery lead connected thereto, said battery cut-out device having a housing to co-locate with the battery, said battery cut-out device having a first high current capacity termination to connect to said battery terminal in place of the existent battery lead, and said battery cut-out device having a second high current capacity termination to connect to the existent battery lead, said battery cut-out device having a fly lead to connect to a terminal of opposite polarity forming a circuit with said battery terminal to provide a power supply for said battery cut-out device, said battery cut-out device having a high current capacity switch selectively connecting between said first high current capacity termination and said second high current capacity termination to make or break the connection therebetween, said high current capacity switch being controlled by a monitoring circuit that senses if a voltage equating to the battery voltage drops below a predetermined level indicative of at least 5% capacity remaining of said rated battery capacity and remains below said predetermined level for a predetermined period of at least five seconds, said monitoring circuit having an output interfaced with said high current capacity switch, said output changing state on said monitoring circuit sensing said voltage equating to the battery voltage dropping below said predetermined level and remaining below said predetermined level for said predetermined period, to deactuate said high current capacity switch; said battery cut-out device including a manually actuable reset switch to reset and reactuate said high current capacity switch, wherein said high current capacity switch also disrupts power to said monitoring circuit, and operation of said manually actuable reset switch restores power to said monitoring circuit.

2. A battery cut-out device as claimed in claim 1 wherein said predetermined level equates to a level indicative of at from 5% to 15% capacity remaining of said rated battery capacity.

3. A battery cut-out device as claimed in claim 1 wherein said predetermined level is set at from 1% to 5% above the minimum operating voltage of the battery.

4. A battery cut-out device as claimed in claim 1 wherein said predetermined level is set at from 1% to 5% below the nominal operating voltage of the battery.

5. A battery cut-out device as claimed in claim 1 wherein said predetermined level is set at a level equating to 3.1 volts per cell, intended for use with a lithium battery.

6. A battery cut-out device as claimed in claim 1 wherein said predetermined level is set at a level equating to between 1.95 volts and 2.0 volts per cell, intended for use with a lead acid battery.

7. A battery cut-out device as claimed in claim 1 wherein said predetermined period is up to 20 seconds.

8. A battery cut-out device as claimed in claim 1 wherein said battery terminal is the negative terminal of said battery and said terminal of opposite polarity is the positive terminal of said battery.

9. A battery cut-out device as claimed in claim 1 wherein the fly lead incorporates an in-line connector for connecting to the battery, which the user can disconnect to power down the battery cut-out device, and in so doing, disconnect power being supplied by the battery.

10. In a battery, a battery cut-out device interposed between a battery terminal and an external battery connector, said battery cut-out device having a fly lead to connect to a terminal of opposite polarity forming a circuit with said battery terminal to provide a power supply for said battery cut-out device, said battery cut-out device having a high current capacity switch selectively connecting between said battery terminal and said external battery connector to make or break the connection therebetween, said high current capacity switch being controlled by a monitoring circuit that senses if a voltage equating to the battery voltage drops below a predetermined level indicative of at least 5% capacity remaining of said rated battery capacity and remains below said predetermined level for a predetermined period of at least five seconds, said monitoring circuit having an output interfaced with said high current capacity switch, said output changing state on said monitoring circuit sensing said voltage equating to the battery voltage dropping below said predetermined level and remaining below said predetermined level for said predetermined period, to deactuate said high current capacity switch; said battery cut-out device including a manually actuable reset switch to reset and reactuate said high current capacity switch, wherein said high current capacity switch also disrupts power to said monitoring circuit, and operation of said manually actuable reset switch restores power to said monitoring circuit.

11. A battery cut-out device as claimed in claim 10 wherein said predetermined level equates to a level indicative of at from 5% to 15% capacity remaining of said rated battery capacity.

12. A battery cut-out device as claimed in claim 10 wherein said predetermined level is set at from 1% to 5% above the minimum operating voltage of the battery.

13. A battery cut-out device as claimed in claim 10 wherein said predetermined level is set at from 1% to 5% below the nominal operating voltage of the battery.

14. A battery cut-out device as claimed in claim 10 wherein said predetermined level is set at a level equating to 3.1 volts per cell, where the battery is a lithium battery.

15. A battery cut-out device as claimed in claim 10 wherein said predetermined level is set at a level equating to between 1.95 volts and 2.0 volts per cell, where the battery is a lead acid battery.

16. A battery cut-out device as claimed in claim 10 wherein said predetermined period is up to 20 seconds.

17. A battery cut-out device as claimed in claim 10 wherein said battery terminal is the negative terminal of said battery and said terminal of opposite polarity is the positive terminal of said battery.

18. A battery cut-out device as claimed in claim 10 wherein the fly lead incorporates an in-line connector for connecting to the battery, which the user can disconnect to power down the battery cut-out device, and in so doing, disconnect power being supplied by the battery.

\* \* \* \* \*